Oct. 9, 1956   M. J. WEBER   2,766,038
SCALE
Filed Aug. 3, 1950.   3 Sheets-Sheet 2
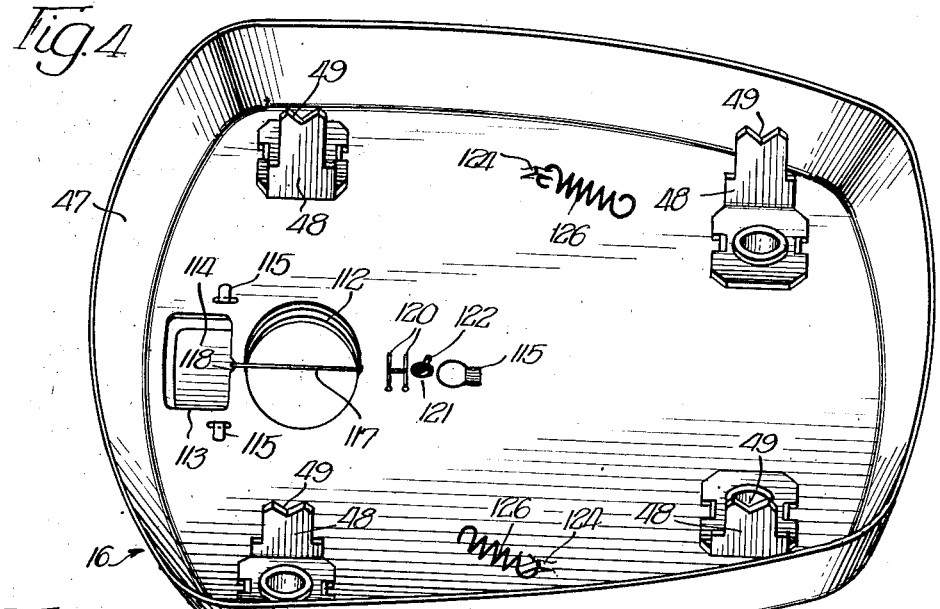
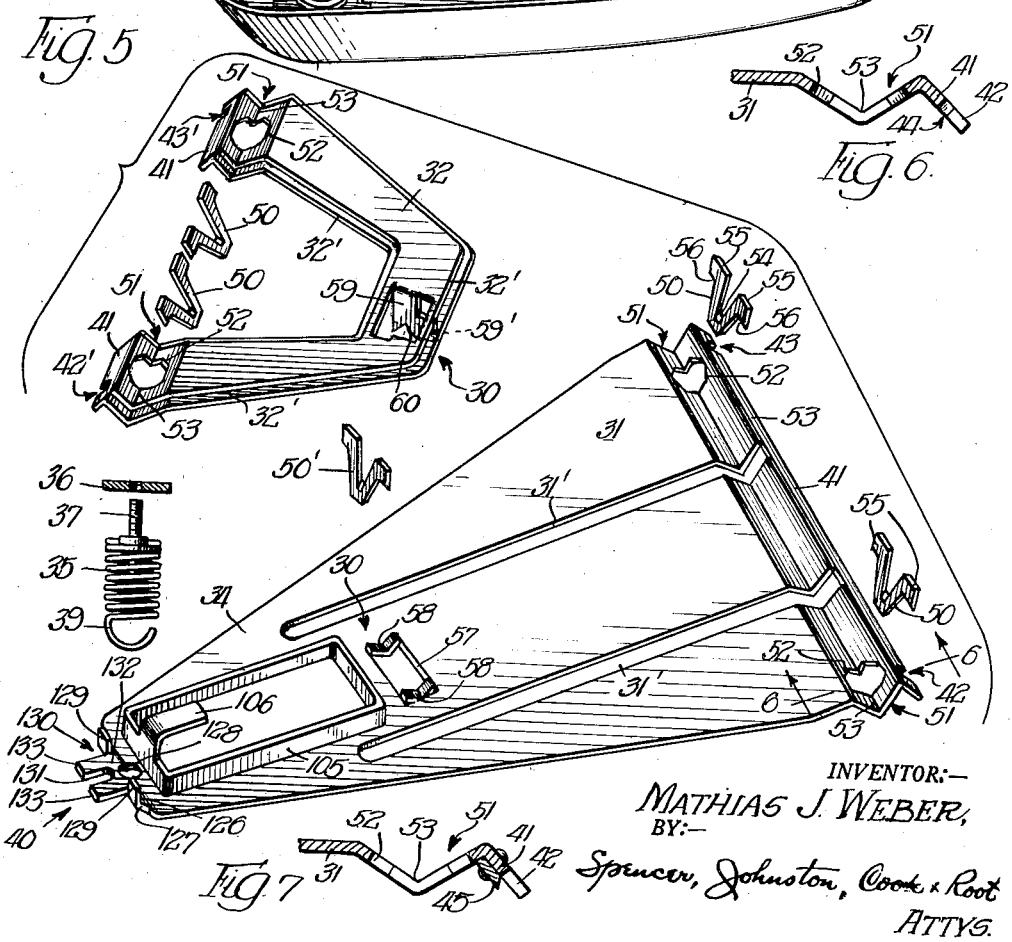
INVENTOR:—
MATHIAS J. WEBER,
BY:—
Spencer, Johnston, Cook & Root
ATTYS.

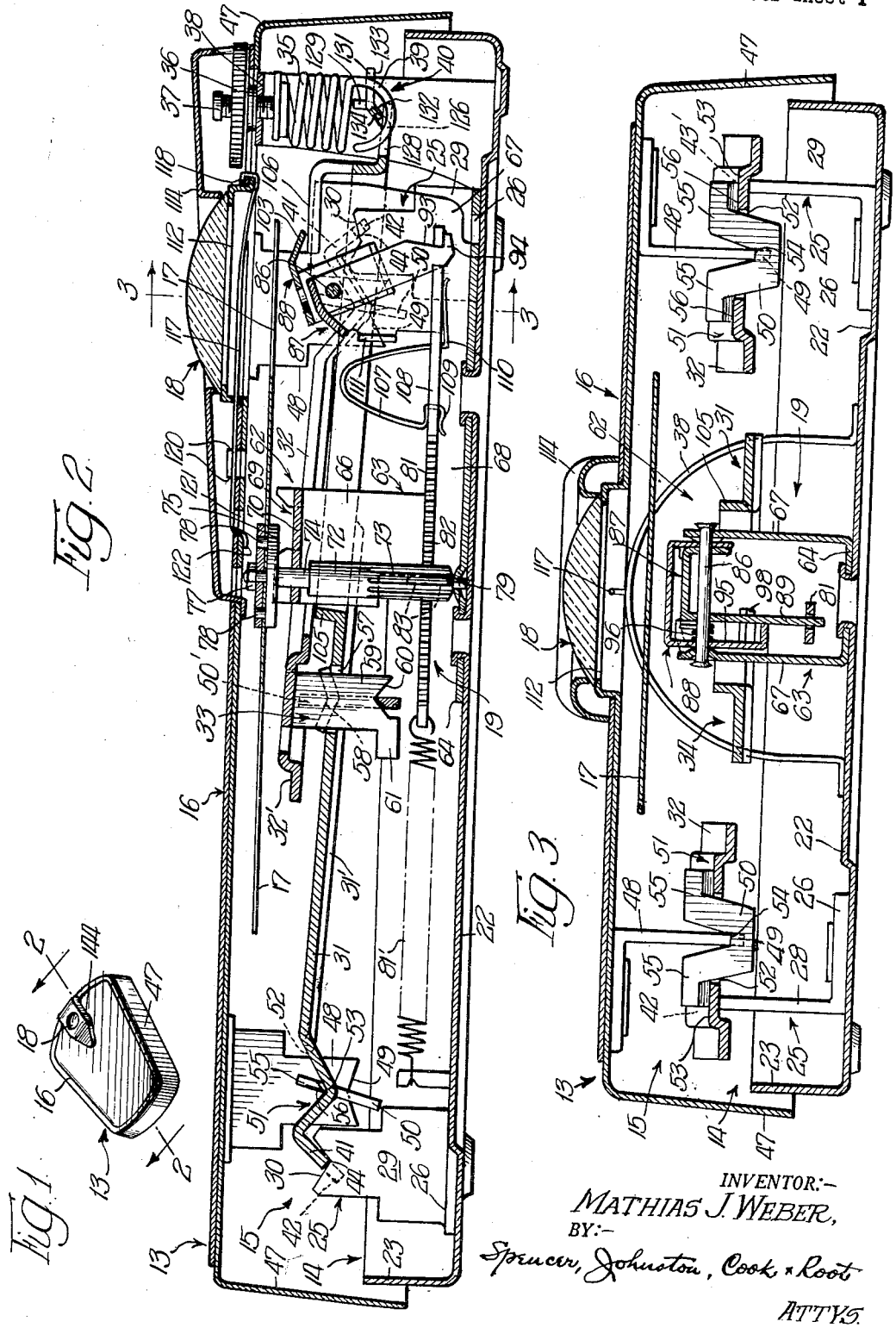

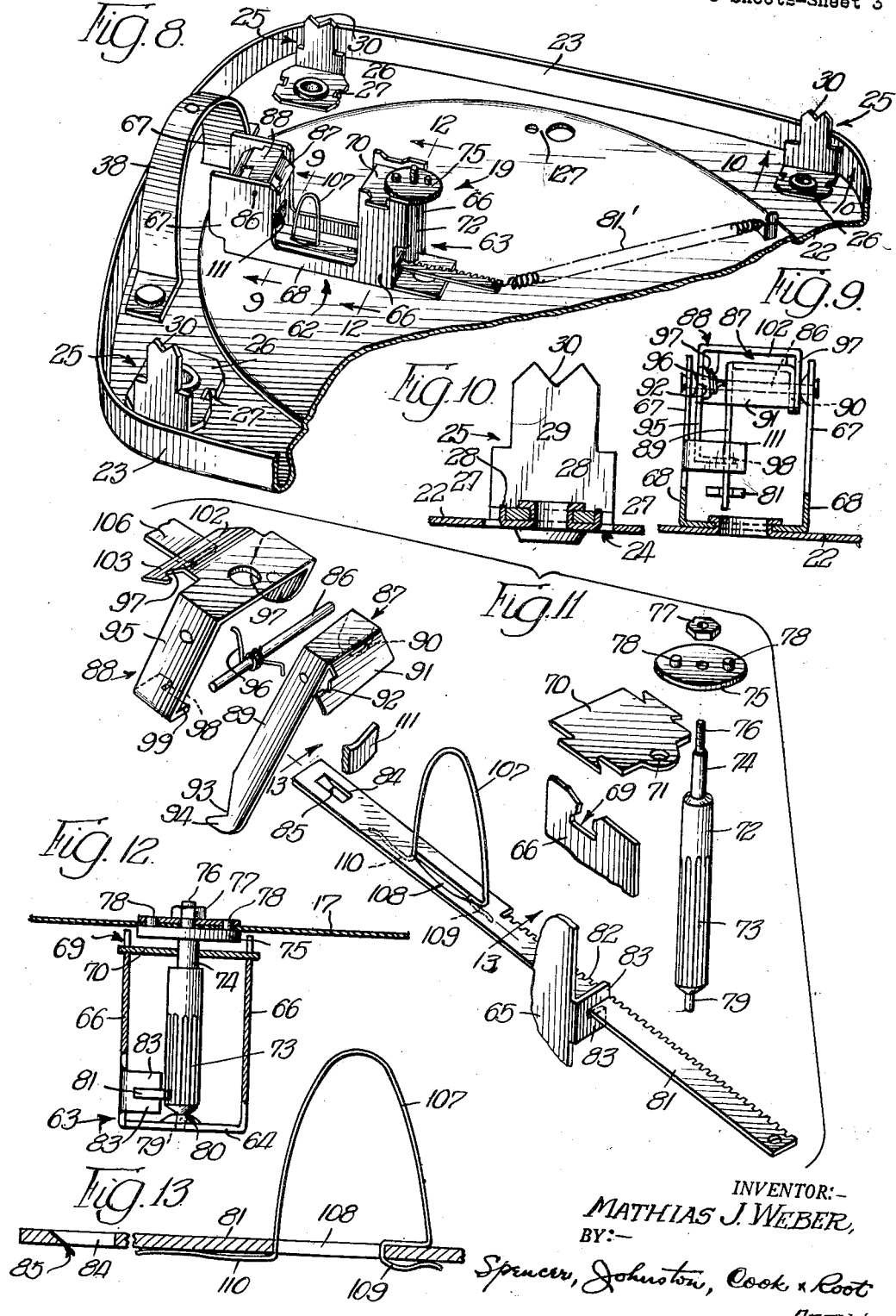

United States Patent Office 2,766,038
Patented Oct. 9, 1956

2,766,038

SCALE

Mathias J. Weber, Chicago, Ill., assignor to Continental Scale Corporation, Chicago, Ill., a corporation of Delaware Application August 3, 1950, Serial No. 177,453

16 Claims. (Cl. 265—68)

The present invention relates in general to weighing scales and has more particular reference to a scale having a weight carrying platform relatively close to the floor and adapted for use as a personal weight scale.

An important object of the present invention is to provide a scale of inexpensive construction and having unusual compactness through the arrangement of operating parts; a further object, in this connection, being to utilize a platform element as a housing for enclosing the weighing mechanism.

Another important object is to provide a weighing scale substantially entirely constructed of formed sheet metal parts arranged to provide sufficient rigidity in the scale structure and particularly in the weight carrying elements thereof to avoid weight measuring error through deflection of the relatively light weight parts when loaded with the weight to be measured.

Another important object is to provide a weighing scale comprising weighing mechanism, including an indicating dial, mounted on a suitable support and enclosed by a preferably drawn sheet metal element forming a weight receiving platform suspended on the weighing mechanism, wherein the platform is provided with an indicator opening through which the indicating dial is exposed to view upwardly of the platform; a further object being to provide novel index means comprising a length of wire extending across said opening, the wire being hookingly engaged in a notch in the platform member on one side of said opening and clampingly secured on a deformed portion of the platform member on the opposite side of the opening, thereby providing an exceedingly simple, inexpensive and readily attached index element against which to accurately read the underlying scale.

Another important object is to provide a scale embodying opposed weighing levers comprising sheet metal stampings having marginal rigidifying flanges to strengthen said levers and prevent deflection thereof under load; a further object being to provide notches in predetermined location in said flanges to form fulcrum knife edges in position to engage support bearings of the weighing scale; a further object being to form such support bearings as notches in sheet metal stampings secured accurately in spaced relation on a drawn sheet metal plate forming the base element of the scale.

Another important object is to form the lever fulcrum knife edges in separate knife edge pieces of hardened material attached on said rigidifying flanges, as by riveting the same thereto at the bearing notches therein.

Another important object is to provide weighing platform support bearings in said weighing levers by slotting and deforming the same to provide openings formed with alined grooves in the lever forming elements, on opposite sides of the openings, whereby to receive platform suspension stirrups rockably in said openings; a further object being to form said stirrups as sheet metal stampings having upwardly facing medial platform carrying knife edges therein and downwardly facing lever engaging knife edges, on opposite sides of the stirrups, in position to rockingly engage the stirrup supporting grooves in said levers on opposite sides of the stirrup openings therein; a further object being to provide downwardly extending support legs on the platform element, said legs comprising sheet metal stampings forming downwardly extending notches at their lower ends for rocking engagement with the upwardly facing medial knife edge portions of said stirrups.

Another important object is to provide for drivingly interconnecting a pair of opposed levers by forming one lever with a central opening and the other with an integral tongue adapted to extend and loosely interfit in said opening; a further object being to form the tongue of one lever with a downwardly facing groove adapted to rockingly engage the medial upwardly facing knife edge of a stirrup having downwardly facing lateral and alined knife edges adapted for rocking reception in alined grooves formed in the other lever on opposite sides of the tongue receiving opening therein, whereby the lever connecting and platform supporting stirrups may all be of identical construction.

Another important object is to form one of the weighing levers with an extension or nose remote from the fulcrum bearings of said lever and formed for suspension on a suitable weighing spring, the nose comprising a formed integral sheet metal portion of the lever; a further object being to form the extension or nose with a longitudinally extending opening, the marginal edges of which are defined by integral rigidifying flanges, said opening being sized to freely receive therein, without interference with the action of the lever, a unitary structure comprising indicator driving mechanism.

Another important object is to provide a weighing scale including spring supported weighing levers, carrying a weight receiving platform, a movable indicator and mechanism for driving the indicator in response to movement of the levers against the influence of the spring, wherein said mechanism is formed as a separate sub-assembly unit adapted for mounting in the weighing scale structure as in accurately predetermined position on the support base element thereof; a further object being to form said sub-assembly unit substantially entirely of precisely stamped sheet metal parts including a frame, an indicator driving rack longitudinally shiftable in suitable bearings in the frame of the sub-assembly unit, to drive the indicator, and shockabsorbing lever elements tiltably mounted in the frame and drivingly connected with the rack and with the weighing levers of the scale.

Another important object is to provide indicator driving mechanism for a weighing scale having a pair of shockabsorbing levers tiltably mounted on a common axis and drivingly interconnected by resilient spring means affording relative movement therebetween in one direction whereby when one of said levers is connected with the weighing levers of the scale and the other is connected with the indicator, said indicator may be positively driven in one direction only in response to movement of the weighing levers.

Another important object of the invention is to provide improved means for drivingly connecting shockabsorbing lever means with an indicator driving rack by forming the rack with a slot providing a knife edge at one end of the slot, and by forming the rack connected lever with a hooked nose adapted for interfitting reception in said slot in position to rockingly engage the knife edge at one end of the slot, whereby to facilitate the assembly of the parts in operative position.

Another important object is to provide a resilient buffer of simplified and inexpensive character on the driving rack of an indicator comprising a length of wire forming a medial loop extending outwardly of the rack in position to engage an abutment when the rack is moved toward the limit of its operating travel in one direction, one end of said wire being frictionally fitted and anchored in an opening formed in the rack, and the other end being mounted in a slot longitudinally of the rack.

Another important object is to provide simplified bearing means for supporting an indicator driving rack for longitudinal movement comprising a rack receiving slot in a rack supporting frame substantially opposite a pinion element drivingly engaged by the rack.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of a weighing scale embodying the present invention;

Fig. 2 is a sectional view taken substantially along the line 2—2 in Fig. 1;

Fig. 3 is a sectional view taken substantially along the line 3—3 in Fig. 2;

Fig. 4 is a perspective view of the underside of a shell element forming a part of the weighing scale;

Fig. 5 is an exploded perspective view of parts of the scale;

Fig. 6 is a fragmentary sectional view taken substantially along the line 6—6 in Fig. 5;

Fig. 7 is a view similar to Fig. 6 showing a modified construction;

Fig. 8 is a perspective view of a portion of the weighing scale;

Figs. 9 and 10 are sectional views taken substantially along the lines 9—9 and 10—10 in Fig. 8;

Fig. 11 is an exploded perspective view of parts of the weighing scale;

Fig. 12 is a sectional view taken substantially along the line 12—12 in Fig. 8; and Fig. 13 is a sectional view taken substantially along the line 13—13 in Fig. 11.

To illustrate the invention the drawings show a weighing scale 13 having a relatively low weighing platform and hence well adapted for use as a personal weight scale. To this end the scale comprises a support base 14, weighing mechanism 15 carried by the base, a weight receiving platform element 16 carried by the mechanism and adapted to move the same in proportion to a weight deposited on the platform for measurement, and graduated dial 17, forming a weight indicating means exposed to view through a window 18 in the platform element, indicator activating means 19 driven by the weighing mechanism to shift the dial with respect to the window.

The base 14 comprises a generally rectangular drawn sheet metal plate 22 preferably having mounted corners and forming a base for the scale and having an upstanding marginal flange defining the peripheral edge of said plate. Inwardly of said edge the plate is formed with depressions 24 providing feet on the under side of the plate near the rounded corners thereof, bearing pedestals 25 comprising preferably identical sheet metal stampings of L-shaped configuration are provided. These pedestals each have a flange 26 formed with a central perforation and adapted to fit snugly in a foot forming depression 24, pressed in the plate 22, the flange 26 being secured in place on the base plate 22 by upwardly punching and curling the material 24' of the base plate, at the central portion of the depression 24, through said central opening of the pedestal flange 26 to thereby, in a sense, rivet and firmly secure the pedestal element on the base in the depression 24. Each flange 26 may be formed with an alining notch or notches 27 in position to engage upstruck projections 28 on the base plate for the purpose of accurately determining the location of the pedestals in the depressions 24.

Each bearing pedestal 25 comprises an integral upstanding web portion 29 having an upwardly facing bearing notch 30 formed at the upper end of the web. The weighing mechanism comprises a pair of opposed weighing levers fulcrumed in the notches of the bearing pedestals, including a relatively long lever 31 supported on the pedestals at one end of the base plate and a relatively short lever 32 supported on the pedestals at the opposite end of the base plate, said levers extending from their supporting pedestals toward each other and being drivingly connected, each with the other, as at 33, substantially centrally of the weighing mechanism. The long lever underlies the short lever and has an integral nose portion 34 extending substantially medially between the spaced bearing pedestals which support the short lever in position for suspension on a weighing spring 35. This spring is adjustably suspended, as by means of the adjusting nut 36 and spring supporting stem 37, on a preferably arcuately shaped or bowed strip 38, suitably anchored at its opposite ends on the base plate, in position to suspendingly carry the weighing spring on the medial portions of the strip 38 by means of the adjusting nut 36 and support stem 37 which is connected with the upper end of the spring. The lower end of the spring may be formed with a detaching loop 39 formed for detachable engagement in a spring mounting notch 40 formed at the extremity of the nose portion 34 of the long lever.

The levers 31 and 32 are preferably formed as stamped sheet metal parts having downwardly extending marginal flanges 41 formed therein at the peripheral edges thereof, and these flanges are notched as at 42 and 43, in the long lever, and at 42' and 43' in the short lever in position registering with the pedestal elements 25 on which said levers are supported. The notches 42 and 42' are preferably just sufficiently wide to receive the upstanding web 29 of a bearing pedestal therein, the notches 43 and 43' being substantially wider. The bottoms of the notches, however, may be sharpened to form knife edges 44 adapted to rockingly engage in the upstanding bearing notches 30 of the pedestals whereby to fulcrum the levers thereon. If desired the knife edges may be formed in separate knife edge elements 45 comprising strips of hardened material that may then be riveted or otherwise securely attached upon the flange portions 41 of the levers in position extending in the notches.

By virtue of the interconnection of the levers at the central connection 33 it will be seen that both levers are suspended on the weighing spring 35, the long lever being directly suspended on the spring and the short lever being supported on the long lever and hence indirectly supported on the spring.

The weighing scale also includes the platform element 16, the same preferably comprising a drawn sheet metal shell having a central weight carrying platform portion 46 and an integral dependent and marginal skirt 47. Means is provided for supporting the platform element on the weighing levers 31 and 32 in position snugly overlying the same, with the marginal skirt 47 extending to and outwardly of the upstanding marginal flange 23 of the base, whereby the weighing levers, the indicating means and associated mechanism are enclosed between and within the casing structure offered by the base plate and the platform element.

To this end the platform carries dependent supporting legs 48 preferably comprising sheet metal elements of L-shaped configuration similar to the bearing pedestals 25 and attached on the underside of the platform element in fashion similar to the attachment of the bearing pedestals on the base plate. The lower ends of the legs 48 are formed with downwardly facing notches adapted to receive and rockingly rest upon support stirrups 50 which in turn are rockingly supported in bearings 51 formed in the levers adjacent the lever fulcrum notches. In this connection the platform supporting levers are accurately positioned and are oriented on the platform near the corners thereof, and the bearings 51 are likewise accurately located in the levers.

The bearings 51 comprise each a slot-like opening 52 forced through the lever, in accurately disposed location therein, the material of the lever being pressed downwardly on opposite sides of the opening to form an alined curve 53 therein on opposite sides of the opening, the platform legs 48 being adapted to extend freely in said openings. The stirrups 50 are preferably identical each comprising a sheet metal stamping generally of V-shaped configuration having an upwardly facing knife edge 54 formed at the apex of the V, and integrally formed oppositely and outwardly extending lugs 55 having downwardly facing alined knife edges 56 therein, at the ends of the arms of the V-shaped element. A stirrup 50 is applied in each of the openings 52 with the knife edges 56 rockingly seated in the grooves 53. The stirrups are thus suspended each in an opening 52 with the medial upwardly facing knife edge thereof in position beneath the lever on which is mounted the knife edges 54 of all of the stirrups being thus lowered in position to rockingly receive and support the notched bearing portions 49 in the platform legs.

The levers 31 and 32 are drivingly connected at 33 by means of a stirrup 50' of construction and configuration preferably identical to the stirrups 50, the long lever being provided with an opening 57 and alined grooves on opposite sides of the opening for the reception of the lateral knife edges of the stirrup 50' in order to sustain said stirrups in the opening 57. The short lever may be provided with downwardly struck tongue 59 in its medial portions remote and equally spaced from the fulcrum edges at the notches 42' and 43'. This tongue is adapted to extend freely in the opening 57 and is formed with a downwardly facing bearing notch 60 adapted to rockingly engage the medial upwardly facing knife edge portion of the stirrup 50' beneath the long lever. The tongue 59 is also preferably formed with an extension 59' adapted to underlie the long lever at an edge of the opening 57, whereby to loosely interlock the levers, without binding the same, when the levers are assembled in interconnected relationship on the bearing pedestals.

From the foregoing it will be apparent that the platform is supported entirely upon the levers, by means of the stirrups. Accordingly, any weight applied to the platform for measurement will be applied upon the levers and hence to the weighing springs. The weighing springs, in accordance with well known principles, will be extended in proportion to the weight applied on the platform thereby allowing the levers to swing in accordance with said weight being measured.

In order to provide means for indicating the weight being measured, the present invention contemplates a sub-assembly structure 62 adapted to be mounted on the base plate 22 and thus to be enclosed between the base plate and the platform element. The mechanism of the sub-assembly structure is drivingly connected with the weighing lever system and in turn serves to drive the dial 17 beneath the window 18. The dial 17 preferably comprises a preferable circular metal plate having a circular weight scale formed thereon in position opposite the window to be viewed therethrough from above the platform element.

The sub-assembly structure 62 may be a precision component and may be mounted on the base plate in accurate position thereon in fashion similar to the mounting of the bearing pedestals 25. To this end the sub-assembly structure 62 may comprise a frame 63, preferably formed as a sheet metal stamping having openings in the bottom of the frame through which the material of the base plate may be pressed and curled over upon the material of the sub-assembly frame to hold it firmly in place on the base plate.

The support base 14 preferably comprises the thin gauge sheet metal plate 22 which is a relatively flimsy member susceptible of limited deformation when stressed, even though reinforced against deformation to some extent by the marginal flanges 23. The medial portions of the support base more particularly are susceptible of upward deflection if, for example, the weighing scale be disposed upon a thick pile carpet when in use. Such upward deflection of the medial portions of the relatively flimsy support base may introduce errors in the operation of the indicator mechanism 62. In order to support the indicator mechanism 62 on the support base 14, in substantially rigid fashion preventing indicator errors due to undesirable deflection of the support base when loaded, the central portions 22' of the sheet metal base plate may be offset upwardly of the marginal portions thereof, as along a circular or oval demarcation line 122 extending inwardly of the lever mounting pedestals 25. The upward offsetting of the channel portion 22' and the bending of the material of the base plate 22 along the curved line of demarcation 122 substantially increases the rigidity of the base plate, including the medial offset portions 22' thereof. The subassembly structure 62 is preferably mounted upon the offset plate portions 22' adjacent the curved marginal edge thereof, defined by the bend line 122, at one end of the element to thus provide adequately firm and rigid support for the indicator mechanism on a sheet of thin gauge, relatively flimsy, and readily deformable material.

The frame 63 may comprise a bottom panel 64 and integral side panels 65, upstanding along the lateral edges of the bottom panel 64, said side panels having spaced end portions 66 and 67 at the opposite ends of the frame and interconnected by intermediate flanges 68. The spaced apart panel portions 66, at one end of the frame, are notched at their upper ends as at 69 to provide a mounting for a transverse connecting plate 70 which is formed with a perforation 71 adapted to receive and form a bearing for the upper end of a turnable stem 72. The stem 72 has an enlarged cylindrical portion longitudinally fluted to form gear teeth 73. At its upper end the stem 72 has a portion of reduced diameter 74 adapted to turnably extend within the perforation 71. The stem portion 74 is adapted to project upwardly of the plate 70 in position to receive non-turnably thereon a mounting plate 75 through which the upper, preferably threaded extremity 76 of the stem 72 is adapted to project in position to receive a fastening nut 77. The disc 75 may be provided with one or more, preferably integral dowel projections 78 adapted to extend in corresponding openings formed near the center of the graduated dial plate 17 which may be secured on the mounting plate 75 by means of the nut 77.

The lower end of the stem 74 is formed axially with a pintle portion 79 of reduced diameter adapted to be journalled for turning movement in a perforation formed in a preferably curved embossment 80 struck upwardly in the bottom panel 64 of the sub-assembly frame. The stem 72 is thus journalled for turning movement on a vertical axis in the frame 63 in position to turnably support the dial plate 17 for turning movement on the base plate 22, the dial plate being thus mounted with its graduated scale in position to swing beneath the window 18.

The indicator driving mechanism includes a longitudinally shiftable rack element 81 having teeth 82 drivingly engaging the teeth 73 of the dial carrying pintle. The rack element 81 is slidably supported between a pair of fingers 83 comprising integral portions of the frame 63, the same being struck inwardly from one of the frame portions 66 in position opposite the pintle 72. The rack element 81 is thus accurately supported on the frame 63 in position drivingly engaging the pintle. Spring means 81' which may be anchored on the base plate 22, is provided for normally urging the rack in one direction on the frame and to draw the rack teeth into snug driving engagement with the teeth of the pintle. The rack element has an end extending to the end of the frame 63 remote from the pintle, said end being formed with a slot 84, the end of which slot forms a knife edge 85.

The spaced frame portions 67 carry a bearing stem 86 having opposite ends secured in openings formed in the frame portion 67. This stem carries a pair of preferably sheet metal lever members 87 and 88 mounted on the stem for tilting movement thereon. The member 87 comprises a sheet metal strip bent to provide an extended arm 89 and a short arm 90, both of said arms being formed with openings through which the shaft 86 extends. The member 87 also has an integral portion 91 forming a notched seat 92 projecting outwardly of the arm 89. At its extremity the arm 89 is notched as at 93 to form a hooked nose 94 adapted for interfitting connection in the slot 84 of the rack to drivingly connect the rack with said arm 89. When so connected the notched portion 93 of the arm rockingly engages the knife edge 85 of the rack to draw the same longitudinally against the influence of the spring 81'.

The member 88 preferably comprises a sheet metal strip having a relatively long arm 95 and a short arm 97, both arms being formed with perforations for receiving the shaft 86, outwardly of the arms 89 and 90 of the member 87. The short arms 90 and 97 of the lever members may be in abutting relationship on the stem, but the arm 95 is spaced outwardly of the arm 89 providing a space therebetween. In said space the rod 86 carries a spring 96 coiled thereabout and having oppositely extending fingers, respectively, engaging in the offset notch 92 of the member 87 and in a notch 98 formed in the medial portions 99, of the lever member 88, which extend between the arms 95 and 97 thereof. As a consequence the members 87 and 88 are yieldingly urged in opposite directions on the stem 86, relative movement of the members under the influence of the spring being limited by a stop shoulder 100 formed on an inturned flange 101 at the extremity of the arm 95, said shoulder being in position to engage an edge of the arm 89 inwardly of the nose portion 94.

The medial portion 99 of the lever member 88 is inclined downwardly, as at 102, to form a bearing edge 103. The structure 62, being mounted on the base plate 22, extends upwardly thereof through an opening 104 formed in the nose portion of the long lever 31, said opening being preferably defined by an upstanding peripheral flange 105 which serves to rigidify the nose portion of the lever. The flange 105 may be interrupted at the nose end of the opening 104 to provide an integral tongue 106 on the lever extending into the opening in position to underlie and press upwardly upon the bearing edge 103 of the lever member 88.

The spring 81', at all times, yieldingly urges the rack 81 in a direction drawing on the lever arm 89; and the spring 96, at all times yieldingly holds the lever arm 95 in engagement with the arm 89 so that the lever member 88 and its bearing edge 103 are constantly biased in a direction to press the bearing edge 103 upon the tongue 106. Accordingly, when the levers 31 and 32 are moved downwardly against the influence of the suspension spring 35 in response to the application of a weight to be measured on the platform, the tongue 106 will be depressed beneath the bearing edge 103 thus allowing the lever member 88 to be turned on the pin 86 by action of the spring 81' and 96, in a direction to follow the downward movement of the tongue 106. The movement of the rack will, of course, be transmitted through the spindle 72 to turn the dial plate 17 in proportion to the movement of the tongue 106 and thus indicate the weight being measured at the window 18.

It will be seen from the foregoing that the driving connection between the levers 87 and 88 is of non-positive character in that the members 87 and 88 are drivingly connected through the spring 96. This connection may yield and allow the lever arms 89 and 95 to separate in the event that the arm 95, driven by the tongue 106 of the weighing lever 31, is turned abruptly by upward movement of the tongue beneath the bearing edge 103, as in the event that the weight being measured is suddenly removed from the weighing platform. Such a condition may occur in a personal weight scale in the event that a person standing thereon jumps suddenly from the scale. Even where a relatively heavy weight on the scale is removed more slowly, the suspension spring 35, being a relatively powerful spring, will tend to move the levers 31 and 32 upwardly with sufficient force to possibly damage the relatively fragile indicator actuating mechanism, if such force be applied positively to such mechanism. The arrangement of the spring 96, however, in the manner herein taught, serves to protect the relatively delicate indicator mechanism against damage of the character mentioned, which is most apt to occur at the knife edge 85 and in the rack and pinion teeth.

The present invention also includes an improved rack buffer construction comprising a length of flexible wire 107 adapted for easy assembly on the rack in a slot 108 formed longitudinally therein. This slot has tapered ends so that a hooked end 109 of the resilient wire 107 may be secured in one end of the slot. The wire 107 may be bowed between its ends in the manner shown, and the end thereof remote from the hooked end may bend, as at 110, to anchor said end yieldingly in the opposite end of the slot 108. One of the frame portions 67 may be provided with an integral finger 111 in position to be engaged by the bowed portion of the wire 107 when the rack reaches the limit of its movement against the influence of the spring 81', in order to provide a yielding buffer effect to check rack movement in the event that the lever member 88 is forced beyond such limit or movement by the tongue 106. Under such conditions the effect of the buffer 107 is to counteract the influence of the spring 96 and allow the lever 89 to separate from the shoulder 93 to thereby limit the bearing force of the notch 93 on the knife edge 85 to a value represented by the tension of the spring 96 at the instant when the shoulder 98 becomes disengaged from the arm 89. The effect of the buffer spring 107 is to apply the force of the spring 96 upon the knife edge 85 in gradually increasing fashion rather than abruptly as the rack reaches the limit of its travel.

The dial 17, as will be seen, is supported horizontally on the mounting plate 75 beneath the platform element 16, which at one end is provided with a preferably circular perforation 112 forming the window 18. Adjacent the opening 112 the platform element is also formed with the opening 113 to accommodate the upper end of the spring mounting stem 37 and the adjusting nut 36 which is sized to project outwardly of the platform element through a portion of the opening 113 extending in the platform element at the junction of the skirt and platform portions thereof. The openings 112 and 113 may be covered by a decorative escutcheon plate 114, preferably a sheet metal stamping, formed with fastening lugs 115 adapted to extend through openings in the platform member and bent therebeneath to hold the escutcheon plate in place thereon. The escutcheon plate may have a slot through which an edge of the adjusting nut 36 may extend, and a circular opening in registration with the opening 112. A glass window pane 116 may be held in place on the escutcheon plate in any suitable fashion to cover the opening 112. Beneath said window pane the platform element carries index means 117, preferably comprising a length of wire mounted on the platform element in position extending diametrally of the opening 112 in position to overlie the graduated edge of the dial 17, so that the dial may be read against the index means 117. In order to facilitate the application of the index wire on the platform element in inexpensive fashion, the edge of the opening 113 may be formed with a mounting notch 118. One end of the wire 117 may be provided with a hook, as at 119, adapted for hooking engagement in the notch 118. On the opposite side of the opening 112 the platform element may be provided with a pair of spaced slits 120 and the material of the platform element may be depressed between the slits to allow the hooked remote end of the wire to be passed through the slits and into an opening 121 formed in the platform element adjacent the slits, in assembling the hooked end of the wire in the notch 118. Thereafter the hook remote extremity of the wire may be bent through the opening 121 as shown at 122′ in order to stretch the wire diametrally across the opening 121. Thereafter the wire may be securely anchored by bending the material of the platform element, between the slits 120 in a direction to clamp the wire securely in place at said slits.

In order to hold the platform element upon the levers 31 and 32 and also to retain said levers on the fulcrum bearings 30, the platform element may be yieldingly connected with the base as by means of a pair of helical springs 123, having each an end, anchored as at 124, on the platform element and another end anchored as at 125 on the base.

An important feature of the invention resides in the spring mounting 40 whereby the weighing levers are suspended on the weighing spring 35. As shown more particularly at the right end of Fig. 2, and in the lower left portions of Fig. 5, the extremity of the nose portion 34 of the lever 31 is bent upwardly, on a line of bend 126, to provide an upwardly inclined flange portion 127. The nose portion 34 also is formed with an opening 128, on the center line of the lever 31, that is to say the center line which bisects at right angles the bearing groove 51 between the openings 52. This opening 128 is formed substantially at the bend line 126 and may have portions disposed on opposite sides thereof. The flange portion 127 is formed with a pair of spaced upstanding fingers 129, and a projecting flange 130, therebetween and extending substantially at right angles with respect to the plane of the fingers 129. This flange 130 lies in a plane substantially parallel with respect to the plane of the lever 31 and is formed with a slot 131, opening at the end of the flange 130, terminating adjacent the opening 128 to form a web 132 therebetween, and disposed with the axis of the slot 131 at the center line of the lever 31. The slot 131 thus extends between and is defined by a pair of outstanding finger portions 133 of the flange 130.

The spring 35 may be attached to the lever 31 by assembling the loop 39 on the mounting 40, before the spring is suspended on the member 38, by mounting the opposite sides of the loop respectively in the slot 131 and in the opening 128, with the medial portions of the loop extending beneath the web 132. When so disposed the fingers 129 will extend in position slightly spaced from and beneath diametrically opposite sides of the lowermost coil of the spring. The lower end of the spring will be held, loosely against turning movement with respect to the lever 31 by the abutments provided, on opposite sides of the loop 39, by the fingers 133 and the sides of the opening 128.

It will be noted that the web 132, by virtue of its inclination, provides a downwardly facing knife edge 134, at the intersection of its lower surface with the edge of the opening 128, said knife edge being in position to engage the medial portions of the attached spring loop 39 on the axis of the spring. The foregoing spring mounting arrangement insures that the spring will be supported at all times in the same operative relationship with respect to the lever. The spring cannot become twisted or wedged in an improperly cocked position on the lever, but is supported always with the loop 39 in the vertical plane through the center line of the lever, and always presenting the medial portions of the loop for precise rocking engagement with the knife edge 134. The arrangement though simple and inexpensive eliminates friction, at the point of connection of the lever with the spring, as well as the danger of a wedged or jammed connection, and hence provides for high accuracy of weight measurement.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In a weighing scale having weighing means movable by a weight to be measured, and a shiftable weight indicator, the combination, with said means and indicator, of indicator driving means comprising a pair of transfer levers mounted for rocking movement, on a common pivot stem, one of said levers comprising a leading and the other a trailing lever, means for moving said leading transfer lever in an advancing direction on said pivot stem in response to movement of said weighing means under the influence of a weight to be measured, spring means mounted on said stem and having driving fingers respectively engaging said levers for yieldingly urging said trailing transfer lever in a direction to follow the movement of the leading lever in said advancing direction, cooperating stop means on said levers for limiting the relative movement thereof under the influence of said spring means, and means drivingly connecting the trailing lever with the indicator.

2. In a weighing scale having weighing means movable by a weight to be measured, and a shiftable weight indicator, the combination, with said means and indicator, of indicator driving means comprising a pair of transfer levers mounted for rocking movement on a common pivot stem, one of said transfer levers comprising a leading and the other a trailing lever, means for moving said leading transfer lever in an advancing direction on said pivot stem in response to movement of said weighing levers under the influence of a weight to be measured, spring means mounted on said stem and having driving fingers respectively engaging said levers for yieldingly urging said transfer levers in opposite directions on the stem, cooperating stop means on said levers for limiting the relative movement thereof in opposite directions whereby yieldingly to cause the trailing lever to follow the movement of the leading lever in said advancing direction, and means drivingly connecting the trailing lever with the indicator.

3. In a weighing scale having weighing means movable by a weight to be measured, and a shiftable weight indicator, the combination, with said means and indicator, of indicator driving means comprising a pair of transfer levers mounted for rocking movement on a common pivot stem, one of said transfer levers comprising a leading and the other a trailing lever, means for moving said leading transfer lever in an advancing direction on said pivot stem in response to movement of said weighing levers under the influence of a weight to be measured, yielding spring means urging said transfer levers in opposite directions on the stem, cooperating stop means on said levers for limiting the relative movement thereof in opposite directions whereby yieldingly to cause the trailing lever to follow the movement of the leading lever in said advancing direction, and means drivingly connecting the trailing lever with the indicator, said levers comprising sheet metal strips having medial portions formed with seat notches for engaging said spring means, and arms bent from said medial portions and perforated to receive said pivot stem, an arm of each lever being extended and formed to provide said stop means in position thereon remote from said pivot stem.

4. In a weighing scale having weighing means movable by a weight to be measured, and a shiftable weight indicator, the combination, with said means and indicator, of indicator driving means comprising a pair of transfer levers mounted for rocking movement, one of said levers comprising a leading and the other a trailing lever, means for moving said leading transfer lever in an advancing direction in response to movement of said weighing means under the influence of a weight to be measured, yielding spring means urging said trailing transfer lever in a direction to follow the movement of the leading lever in said advancing direction, cooperating stop means on said levers for limiting the relative movement thereof under the influence of said spring means, and means drivingly connecting the trailing lever with the indicator, comprising a turnable spindle drivingly connected with said indicator and formed with gear teeth, a rack bar having teeth engaged with the gear teeth of said spindle, said bar having a slot adapted to receive said trailing lever and formed with a knife edge at one end of said slot in position to engage the trailing lever with the knife edge in response to movement of the weighing levers when a weight is applied to the platform, and yielding spring means urging the rack bar in a direction to yieldingly hold the knife edge against said arm.

5. In a weighing scale having weighing means movable by a weight to be measured and a shiftable weight indicator, the combination, with said means and indicator, of indicator driving means comprising a turnable spindle drivingly connected with said indicator and formed with gear teeth, a rack bar having teeth engaged with the gear teeth of said spindle, said bar having a slot formed with a knife edge at one end of said slot, a pair of transfer levers, including a leading and a trailing lever, mounted for rocking movement, means for rocking said leading lever in an advancing direction in response to application of a weight to be measured on said weighing means, spring means urging said trailing lever yieldingly in a direction to follow the movement of the leading lever in said advancing direction, cooperating stop means on said levers for limiting relative movement thereof under the influence of said spring means, said trailing lever having a driving arm disposed in said slot in position to rockingly engage said knife edge whereby to draw said arm upon the knife edge in response to movement of the weighing means under the influence of a weight to be measured, and yielding spring means movably urging the rack bar in a direction to yieldingly resist the advancing movement of said arm.

6. In a weighing scale having weighing means movable by a weight to be measured and a shiftable weight indicator, the combination, with said means and indicator, of indicator driving means comprising a turnable spindle drivingly connected with said indicator and formed with gear teeth, a rack bar having teeth engaged with the gear teeth of said spindle, said bar having a slot formed with a knife edge at one end of said slot, a pair of transfer levers, including a leading and a trailing lever, mounted for rocking movement, means for rocking said leading lever in an advancing direction in response to application of a weight to be measured on said weighing means, spring means urging said trailing lever yieldingly in a direction to follow the movement of the leading lever in said advancing direction, cooperating stop means on said levers for limiting relative movement thereof under the influence of said spring means, said trailing lever having a driving arm disposed in said slot in position to rockingly engage said knife edge, said arm having a notch adapted to receive said knife edge and a nose adapted for interfitting reception in said slot whereby to draw said arm upon the knife edge in response to movement of the weighing means under the influence of a weight to be measured, and yielding spring means movably urging the rack bar in a direction to yieldingly resist the advancing movement of said arm.

7. In a weighing scale having a weight receiving platform and a weight indicator, the combination therewith of weighing mechanism operable to actuate the indicator in response to the application of a weight on the platform comprising a sheet metal plate forming a support base provided with spaced apart upstanding sheet metal strips forming upwardly facing fulcrum bearings, at the opposite ends of the support base, a pair of sheet metal plates forming levers having knife edge means at an end of each lever in position to engage with said fulcrum bearings to fulcrum said levers on the base, each at a corresponding end thereof, spring means suspending said levers on said base and means for suspending the weighing platform on the levers, said platform having downwardly extending support legs, each lever forming plate adjacent the base fulcrumed end thereof being formed with a transversely extending and upwardly facing valley having a bottom of V-shaped sectional configuration, and openings therethrough in said valley for receiving said support legs, and a stirrup extending in each opening and rockably carrying a corresponding one of said support legs, each stirrup having oppositely extending knife edges rockably seated on the bottom of a said valley on opposite sides of the opening in which the stirrup extends.

8. In a weighing scale having a weight receiving platform and a weight indicator, the combination therewith of weighing mechanism operable to actuate the indicator in response to the application of a weight on the platform comprising a sheet metal plate forming a support base provided with spaced apart upstanding sheet metal strips forming upwardly facing fulcrum bearings, at the opposite ends of the plate, a pair of the sheet metal plates forming levers and having a downwardly inclined flange at one end of each lever, said flange being provided with spaced notches forming spaced apart shoulders, and means forming knife edges between said spaced apart shoulders for engagement with said fulcrum bearings to fulcrum said levers on the base, each at a corresponding end thereof, means to yieldingly suspend said levers on said base, said levers being each formed with an upwardly facing groove spaced inwardly of and parallel to said knife edge means, and being formed with openings therethrough in said groove, adjacent said knife edge means, a stirrup in each of said openings and having knife edges riding in said groove on opposite sides of the opening in which disposed, said stirrups each having an upwardly facing knife edge for engaging downwardly facing bearings on said platform.

9. In a weighing scale having weighing means movable by a weight to be measured, and a shiftable weight indicator, the combination, with said weighing means and indicator, of indicator driving means comprising a rack bar movable longitudinally in one direction to drive the indicator in response to movement of the weighing means under the influence of a weight to be measured and buffer means comprising a bowed element anchored at one end on said rack and supported at the other end for shifting movement longitudinally of the rack in position to yieldingly engage a stop shoulder for yieldingly buffering the rack at a limit of its operating movement in one direction.

10. A weighing scale comprising a weighing spring, a weighing lever suspended on said spring, said spring comprising helical coils and having a terminal loop, said lever having a sheet metal nose formed with an upwardly inclined portion defining a downwardly facing knife edge, in said inclined portion, in position to rockingly engage said loop, said nose having a pair of spaced apart upstanding lugs in position to underlie a loop adjacent coil of said spring to retain the loop in operative position with respect to the knife edge.

11. A weighing scale comprising a weighing spring, a weighing lever suspended on said spring, said spring comprising helical coils and having a terminal loop, said lever having a sheet metal nose formed with an upwardly inclined portion having an opening formed therein and defining a downwardly facing knife edge, in said inclined portion, in position to rockingly engage said loop, said nose having a pair of spaced apart upstanding lugs in position to underlie a loop adjacent coil of said spring in order to retain the loop in operative position with respect to the knife edge.

12. A weighing scale comprising a weighing spring, a weighing lever suspended on said spring, said spring comprising helical coils and having a terminal loop, said lever having a sheet metal nose formed with an upwardly inclined portion and an opening defining a downwardly facing knife edge, in said inclined portion, in position to rockingly engage said loop when assembled in said opening, said nose having a pair of spaced abutments spaced from said knife edge for retaining said spring loop against relative turning movement on the knife edge, said nose having a pair of spaced apart upstanding lugs in position to underlie a loop adjacent coil of said spring to retain the loop in operative position with respect to the knife edge.

13. In a weighing scale having weighing means movable by a weight to be measured, and a shiftable weight indicator, the combination, with said means and indicator, of a relatively thin gauge sheet metal plate forming a support base for said weighing means and indicator, said plate having marginal portions and a medial portion offset upwardly of said marginal portions to provide an elevated seat for said indicator, and upstanding bearing pedestals secured in spaced apart relationship on said plate at said marginal portions for supporting said weighing means, on said base, outwardly of said upwardly offset medial portion.

14. In a weighing scale having weighing means movable by a weight to be measured, and a shiftable weight indicator, the combination, with said means and indicator, of a relatively thin gauge sheet metal plate forming a support base for said weighing means and indicator, said plate having marginal portions and a medial portion offset upwardly of said marginal portions along a curved line of demarcation forming the peripheral edge of said medial portion, whereby to rigidify the base and to provide an elevated seat for said indicator, and upstanding bearing pedestals secured in spaced apart relationship on said plate at said marginal portions for supporting said weighing means, on said base, outwardly of said upwardly offset medial portion.

15. In a weighing scale having weighing means movable by a weight to be measured, and a shiftable weight indicator, the combination, with said means and indicator, of a relatively thin gauge sheet metal plate forming a generally rectangular support base for said weighing means and indicator, said plate having a medial portion offset upwardly of said marginal portions along a curved line of demarcation forming the circular peripheral edge of said medial portion, whereby to rigidify the base and to provide an elevated seat for said indicator, and upstanding bearing pedestals secured in spaced apart relationship on said plate at the corners thereof in said marginal portions for supporting said weighing means on said base, outwardly of said upwardly offset medial portion.

16. A weighing scale comprising a weighing spring, a weighing lever suspended on said spring, said spring comprising helical coils and having a terminal loop, said lever having a sheet metal nose formed with an upwardly inclined portion defining a downwardly facing knife edge, in said inclined portion, in position to rockingly engage said loop, said nose having a pair of spaced apart upstanding lugs in position to underlie a loop adjacent coil of said spring to retain the loop in operative position with respect to the knife edge, said nose also having a pair of spaced apart abutments adjacent said knife edge for retaining said spring loop against relative turning movement on the knife edge.

References Cited in the file of this patent

UNITED STATES PATENTS

| | | |
|---|---|---|
| 322,870 | Turnbull | July 21, 1885 |
| 848,757 | Lomb | Apr. 2, 1907 |
| 1,001,636 | Goetz | Aug. 29, 1911 |
| 1,252,916 | McFarlane | Jan. 8, 1918 |
| 1,259,362 | Chatillon | Mar. 12, 1918 |
| 1,310,940 | Bergen | July 22, 1919 |
| 1,407,987 | Crane | Feb. 29, 1922 |
| 1,563,089 | Jaenichen | Mar. 24, 1925 |
| 1,591,594 | Wetzel | July 6, 1926 |
| 1,779,927 | Bullock | Oct. 28, 1930 |
| 1,790,509 | Moyer | Jan. 27, 1931 |
| 1,872,920 | Fisher | Aug. 23, 1932 |
| 1,980,045 | Florman | Nov. 6, 1934 |
| 2,003,360 | Hansen | June 4, 1935 |
| 2,013,961 | Hurt | Sept. 10, 1935 |
| 2,016,703 | Breaden | Oct. 8, 1935 |
| 2,020,408 | Fruth | Nov. 12, 1935 |
| 2,056,546 | Weber | Oct. 6, 1936 |
| 2,070,786 | Eschenbacher | Feb. 16, 1937 |
| 2,097,919 | Garbell | Nov. 2, 1937 |
| 2,098,845 | Weber | Nov. 9, 1937 |
| 2,098,846 | Weber | Nov. 9, 1937 |
| 2,117,267 | Ames | May 17, 1938 |
| 2,173,970 | Lagerholm | Sept. 26, 1939 |
| 2,228,874 | Greenleaf | Jan. 14, 1941 |
| 2,232,830 | Sutton | Feb. 25, 1941 |
| 2,277,958 | Conners | Mar. 31, 1942 |
| 2,293,572 | Sutton | Aug. 18, 1942 |
| 2,310,560 | Weber | Feb. 9, 1943 |
| 2,321,585 | Cummings | June 15, 1943 |
| 2,336,695 | Maurer | Dec. 14, 1943 |
| 2,466,724 | Meyer | Apr. 12, 1949 |

FOREIGN PATENTS

| | | |
|---|---|---|
| 429,990 | Great Britain | June 11, 1935 |
| 103,994 | Australia | June 2, 1938 |